United States Patent
Cherichetti et al.

(10) Patent No.: US 6,219,838 B1
(45) Date of Patent: Apr. 17, 2001

(54) DITHERING LOGIC FOR THE DISPLAY OF VIDEO INFORMATION

(75) Inventors: Cory A. Cherichetti, Cameon Park; Joseph D. Harwood, Milpitas, both of CA (US)

(73) Assignee: Sharewave, Inc., El Dorado Hills, CA (US)

(*) Notice: Subject to any disclaimer, the term of this patent is extended or adjusted under 35 U.S.C. 154(b) by 0 days.

(21) Appl. No.: 09/139,159

(22) Filed: Aug. 24, 1998

(51) Int. Cl.$^7$ .............................. H04N 5/21; H04N 5/445
(52) U.S. Cl. ..................... 725/38; 348/630; 348/453; 382/162
(58) Field of Search ..................... 345/150, 431, 345/327, 328; 382/162–166; 358/457; 348/630, 640, 446, 453

(56) References Cited

U.S. PATENT DOCUMENTS

| | | | |
|---|---|---|---|
| 5,774,577 | * 6/1998 | Ueda et al. ........................... | 382/162 |
| 5,905,504 | * 5/1999 | Barkans et al. ...................... | 345/431 |
| 5,991,438 | * 11/1999 | Shaked et al. ....................... | 382/162 |
| 6,008,794 | * 12/1999 | Ishii .................................... | 345/150 |
| 6,057,831 | * 5/2000 | Harms et al. ........................ | 345/327 |

* cited by examiner

*Primary Examiner*—Victor R. Kostak
(74) *Attorney, Agent, or Firm*—Blakely Sokoloff Taylor & Zafman LLP

(57) ABSTRACT

Dithering logic includes a number of programmable linear feedback shift registers (LFSRs), each configured to receive one of a number of color components (e.g., red-green-blue) of a video information signal as an input and to provide one of a number of dithered color components of the video information signal as an output. The dithered color components each include a greater number of bits than the color components. The LFSRs may be configured so that each LFSR includes a mask register configured to accept a characteristic polynomial. The dithering logic may be included in a set-top controller of a computer network that is organized to include a graphics processor communicatively coupled to the set-top controller. The dithering logic is thus configured to introduce pseudorandom noise into video information signals transmitted from the graphics processor to the set-top controller in accordance with one or more characteristic polynomials. Preferably, the characteristic polynomials are primitive polynomials.

13 Claims, 4 Drawing Sheets

DITHERING LOGIC FOR THE DISPLAY OF VIDEO INFORMATION

FIELD OF THE INVENTION

The present invention relates to the processing of video information generated for display on a non-interlaced computer display prior to presentation on an interlaced television display.

BACKGROUND

With the convergence of digital information in the home, a need has arisen for the integration of home computers with other information appliances. In co-pending application Ser. Nos. 08/792,003 and 08/792,361, both filed Jan. 31, 1997, and assigned to the Assignee of the present invention, an exemplary digital wireless home network was described. The network has at its heart an information furnace that allows users to enjoy a variety of multimedia content distributed from a host computer to various appliances throughout the home. Within this vision of the information furnace, the home computer is established as the central aggregation point for digital content in the home, which content is then wirelessly distributed to locations and appliances throughout the home that are optimal for its consumption. These alternative consumption locations enable new dynamics in the use of multimedia content, including mobility, comfort, social interaction, and linkages with other household appliances, such as audio/visual systems. The information furnace further allows users to consume the content in their preferred locations (and even be mobile in the home if desired), enables multiple users to simultaneously interact with the content, and reduces the cost of the appliances used to access the content (computing resources, such as the CPU, memory and modem are leveraged from a central source).

The distribution of video information as part of the home network environment presents certain challenges for the network designer. For example, digital video information ordinarily destined for display on a computer monitor or other display unit is generally provided in an R-G-B (red-green-blue), noninterlaced format for that video display unit. If consumer appliances such as televisions are to make use of the video information, the format of this information must be altered to an acceptable format (e.g., NTSC compatible, interlaced video information). Thus, what is needed is a scheme for preprocessing the video information prior to presentation on the television display screen.

SUMMARY OF THE INVENTION

In one embodiment, dithering logic for use in the display of video information includes a number of programmable linear feedback shift registers (LFSRs), each configured to receive one of a number of color components (e.g., red-green-blue) of a video information signal as an input and to provide one of a number of dithered color components of the video information signal as an output. The dithered color components each include a greater number of bits than the color components. The LFSRs may be configured so that each LFSR includes a mask register configured to select a characteristic polynomial.

In a further embodiment, a circuit for use in the processing of video information may include a number of programmable pseudorandom number generators, each associated with a color component (e.g., red-green-blue) of a video signal, and a number of logic circuits, each associated with one of the pseudorandom number generators and configured to logically combine the associated color component of the video signal with output signals of the associated pseudorandom number generator. Preferably, each of the pseudorandom number generators is programmable via a mask register configured to select a characteristic polynomial. Further, each of the logic circuits may include a number of logical AND gates.

In yet another embodiment, a computer network is organized to include a graphics processor configured to transmit video information signals, and a set-top controller communicatively coupled to the graphics processor so as to receive the video information signal. The set-top controller includes programmable dithering logic configured to introduce random noise into the video information signal in accordance with one or more characteristic polynomials. Preferably, the characteristic polynomials are primitive polynomials.

The dithering logic may include a number of programmable linear feedback shift registers (LFSRs), each configured to accept one of the characteristic polynomials and to produce one or more low order bits of at least one of a number of color components (e.g., red-green-blue) present in the video information signal in accordance therewith. Further, each of the LFSRs may be coupled to an associated mask register configured to store at least one of the characteristic polynomials.

The dithering logic may further include a number of logical combining blocks; each associated with one of the LFSRs. Each logical combining block may be configured to accept one or more outputs of its associated LFSR and one or more bits of an associated color component. Thus, each block may produce one or more low order bits of the associated color component from its inputs. Preferably, the logical combining blocks are each made up of one or more logical AND gates. In one particular embodiment, the logical combining block associated with the green one color component includes fewer logical AND gates than the logical combining blocks associated with either the red or blue color components.

BRIEF DESCRIPTION OF THE DRAWINGS

The present invention is illustrated by way of example, and not limitation, in the figures of the accompanying drawings in which like reference numerals refer to similar elements and in which.

DETAILED DESCRIPTION

A video processing scheme that may find application in a digital wireless home network or other computer network environment is disclosed herein. Although discussed with reference to certain illustrated embodiments, upon review of this specification, those skilled in the art will recognize that the present invention may find application in a variety of systems. Therefore, in the following description the illustrated embodiments should be regarded as exemplary only and should not be deemed to limit the scope of the present invention.

Figure 1:
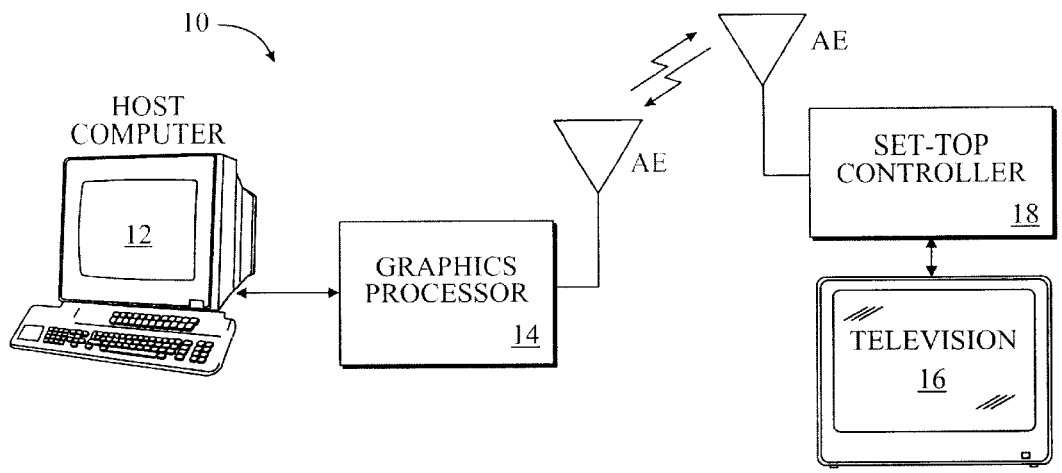
FIG. 1 illustrates components of a digital wireless home network according to one embodiment of the present invention.

FIG. 1 illustrates a digital wireless home network 10 configured in accordance with one embodiment of the present invention. Digital wireless home network 10 has at its heart a personal computer 12 and an accompanying graphics processor 14. Together, personal computer 12 and graphics processor 14 act as a central aggregation point for digital content (e.g., video, audio and graphical information), which content may then be wirelessly distributed to various locations and appliances, including television 16. Television 16 receives this digital content through set-top controller 18, which is coupled in wireless communication with graphics processor 14 (and/or personal computer 12). Of course, in other embodiments, the wireless communication link between graphics processor 14 and set-top controller 18 may be replaced by a wired communication link. Also, although graphics processor 14 and set-top controller 18 are illustrated as separate components, in other embodiments the functions of graphics processor 14 may be included wholly or partially within personal computer 12 and those of set-top controller 18 may be included wholly or partially within television 16.

Included within the digital content transferred to television 16 across network 10 is video information. In one embodiment, the video information comprises digitally encoded video images relating to applications such as video-conferencing, interactive computing, entertainment and/or educational programming, etc. Preferably, this video information is transferred in a compressed data format to ease bandwidth requirements on the wireless (or wired) communication link.

Within the environment of network 10, the video information transferred to television 16 may originate as synthetic or computer-generated video information as may be produced or utilized by an application program running on personal computer 12. For example, network 10 allows a user session (separate from any other session that may be hosted on personal computer 12) to be initiated using set-top controller 18 as a gateway to personal computer 12 (e.g., via graphics processor 14). Thus, television 16 may be used as a display device for this session. As part of the session, computer-generated images (such as may comprise a user desktop and/or application specific image) will be displayed on television 16.

In general, the computer-generated video information for display on television 16 will be produced in a format more suited for display on a conventional, noninterlaced computer monitor. This is because computer application programs and operating systems are generally configured to provide video information for display on such devices. Therefore, before this video information can be displayed on television 16, it will have to be converted into a compatible format, for example, interlaced NTSC-compatible video. Graphics processor 14 and set-top controller 18 provide the necessary video display processing means to generate video information suitable for display on television 16 from the computer-generated video information provided by host computer 12.

Figure 2A:
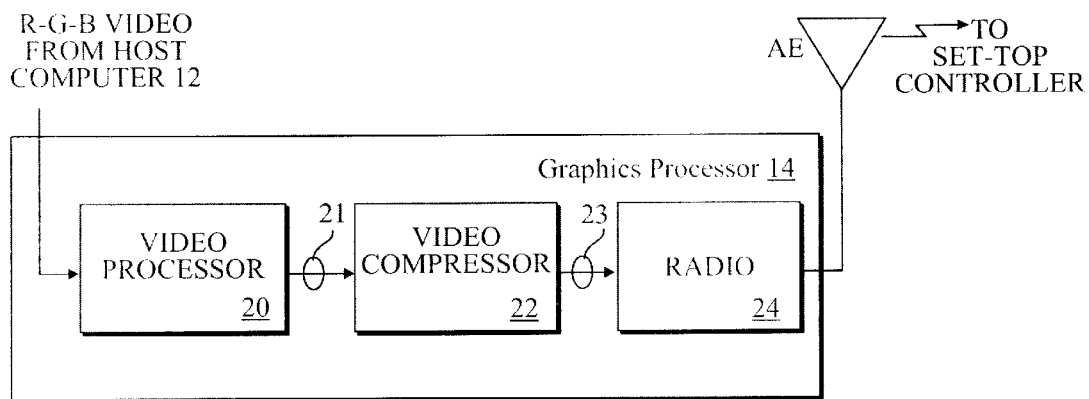
FIG. 2A is a functional representation of a graphics processor component of the digital wireless home network illustrated in FIG. 1 according to one embodiment of the present invention.
Figure 2B:
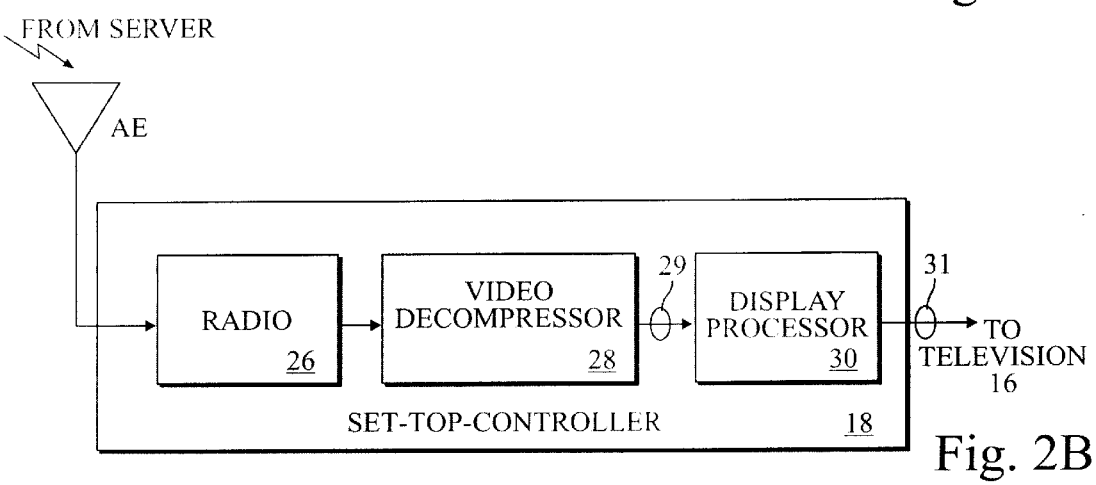
FIG. 2B is a functional representation of a set-top controller component of the digital wireless home network illustrated in FIG. 1 according to one embodiment of the present invention.

FIGS. 2A and 2B illustrate the functional components of graphics processor 14 and set-top controller 18 used in the conversion of the video information to a format suitable for display on television 16. As shown in FIG. 2A, video processor 20 receives video information from host computer 12. Video processor 20 is responsible for scaling the video information to a size appropriate for display on television 16. In general, computer-generated video information is produced with a vertical resolution that exceeds the usable display range of television 16, thus vertical scaling is required to fit the information into the display area provided by television 16. As part of the scaling process, video processor 20 may utilize anti-flicker filtering to reduce or eliminate the effects of flicker on the eventual display.

Many times, computer-generated video information is produced in an R-G-B (red-green-blue) format common to computer display devices. Although such video information may be transmitted within digital network 10, in one embodiment, video processor 20 is configured to convert the R-G-B information in the appropriately scaled video image into another color scheme, e.g., Y-U-V color space, which is more suitable for image processing. In Y-U-V color space, Y represents the luma component of the video information while U and V represent the color difference components.

The scaled video information 21 is provided to video compressor 22 where it is reformatted prior to transmission to television 16. Any of a number of conventional video compression techniques may be used to reduce the bandwidth requirements of the video information 21. In one embodiment, a video compressor that utilizes a unique self-adaptive video compression scheme based on wavelet compression technology is used. This scheme is more fully described in co-pending application, entitled "Self-Adaptive Video Data Compression", assigned to the Assignee of the present invention. As indicated above, the use of a video compressor 22 is optional, however, any scheme that does not employ some form of video compression will require more bandwidth for the transmission of the video information than schemes that do.

The compressed video data 23 is provided to a radio 24, which may packetize the data for transmission across the wireless communication link to set-top controller 18. In those schemes that rely on a wired communication link, other suitable media access devices (e.g., Ethernet access modules, etc.) may be used in place of radio 22. In one embodiment, radio 22 communicates with set-top controller 18 using a wireless, spread spectrum communication protocol adapted for use in network 10.

Now referring to FIG. 2B, at set-top controller 18 the video information from graphics processor 14 is received by radio 26. Radio 26 is configured to operate according to the same protocol as radio 24 in graphics processor 14, hence, the two radios 24 and 26 serve as the communication access devices for network 10. As indicated above, in other embodiments, e.g., where different communications media are used, other suitable communication media access devices may be used. Radio 26 may perform frame reconstruction operations to build up a complete frame of information from several packets that were transmitted by radio 24. Ultimately, radio 26 provides a frame's worth of compressed video information to a video decompression engine 28.

Video decompression engine 28 expands the compressed video information received from graphics processor 14 into a decompressed format and provides the resulting video information signals 29 to a display processor 30. Display processor 30 formats the video signals 29 into the required format for display on television 16. For example, in some embodiments, display processor 30 may provide the necessary horizontal and/or vertical synchronization signals as well as dithering control and interlacing sequences required to display the video information on a conventional NTSC compatible television 16. Thus, set-top controller 18 provides NTSC (or other, e.g., PAL) compatible television video signals 31 to television 16.

Figure 3:
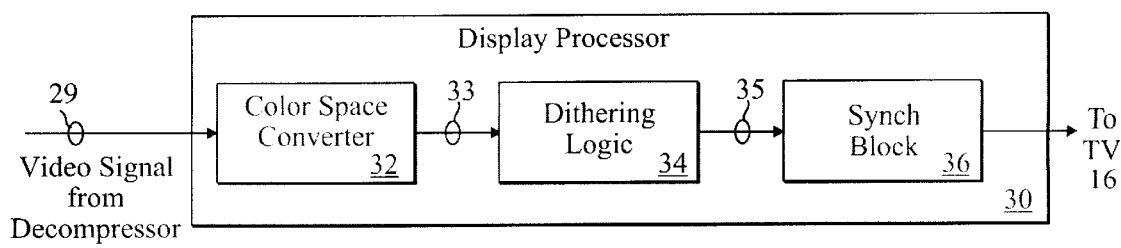
FIG. 3 illustrates the functional components of a display processor for the set-top component of the digital wireless home network illustrated in FIG. 2B according to one embodiment of the present invention.

FIG. 3 now illustrates one embodiment of display processor 30 of set-top controller 18 in more detail. Display processor 30 includes a color space converter 32, dithering logic 34 and synchronization block 36. Color space converter 32 is used to convert the Y-U-V color information in video signals 29 to R-G-B color information. The R-G-B video signals 33 are then passed to dithering logic 34.

As is known in the art, dithering is a process by which random "noise" is added to color components of a video signal in order to blend or dither different color intensities between pixels, to prevent the human eye from observing intensity changes as discrete steps. In one embodiment of the present scheme, dithering logic 34 includes independent, programmable linear feedback shift registers (LFSRs) for each color component (e.g., red-green-blue) of the video information signal 33 to provide the random noise. The LFSRs may be configured using polynomial values via a mask register included within the dithering logic. Pseudo-random bit patterns produced by each of the LFSRs according to their respective characteristic polynomials may be logically combined (e.g., ANDed) with the respective color components of the video information signal to allow for the blending of different intensities across pixels of the video information signal. Each LFSR may be updated with a new polynomial value for each frame of the video information signal.

The output video signal 35 from dithering logic 34 is provided to synchronization block 36 where the color information present in the video signal 35 is combined with an NTSC-compatible framing signal (or other framing signal where television 16 operates according to different standards, e.g., PAL or SECAM) for presentation to television 16.

Figure 4:
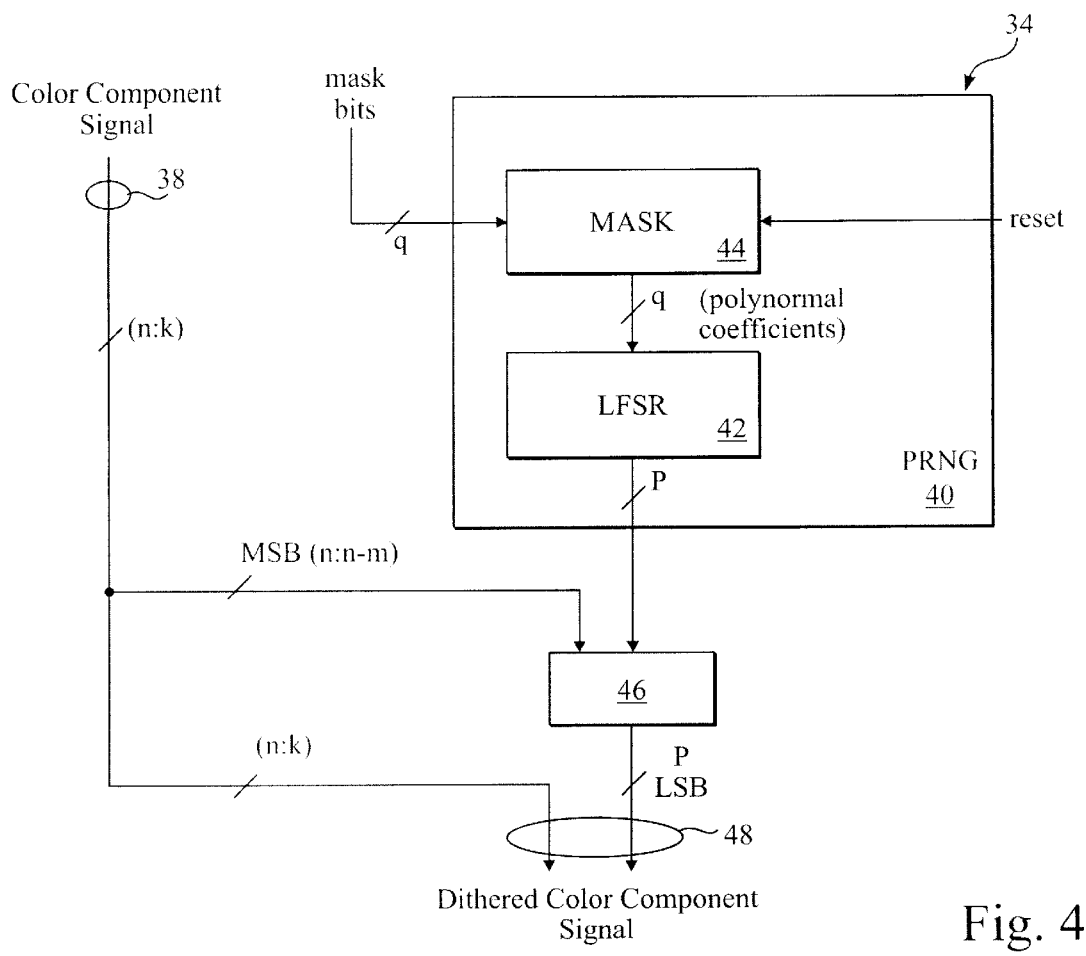
FIG. 4 illustrates a programmable pseudorandom number generator for use in the display processor shown in FIG. 3 in accordance with an embodiment of the present invention.

Referring now to FIG. 4, in one embodiment the dithering logic 34 is implemented as three independent pseudo-random number generators (PRNGs), one for the red color component of the video information signal, one for the green color component and one for the blue color component. The diagram illustrates an individual color component 38 of the video information signal 33. Color component signal 38 includes a number of bits (n:k), which may vary depending upon which color component is being referred to. For example, in video information signal 33, there may be five (5) bits of red color component information, six (6) bits of green color component information and five (5) bits of blue color component information. Other embodiments may have different numbers of bits for color information. Through the dithering process, each of these color component signals (R-G-B) will be expanded to eight (8) (or more) bits, for example.

Each PRNG 40 is made up of an LFSR 42 having "q" (e.g., eight) programmable feedback taps. Thus, all significant polynomial values of order q or less may be programmed into each of the LFSRs via individually associated masks 44. The most significant bits (MSB) of the corresponding pixel's color component signal 38 (n:n−m>k) are logically combined in combination logic 46 (e.g., using AND gates) with any p-bits (e.g., the most significant bits (MSB)) of the output of the LFSRs 42 to produce the least significant bits (LSB) of a dithered color component signal 48.

Figure 5A:
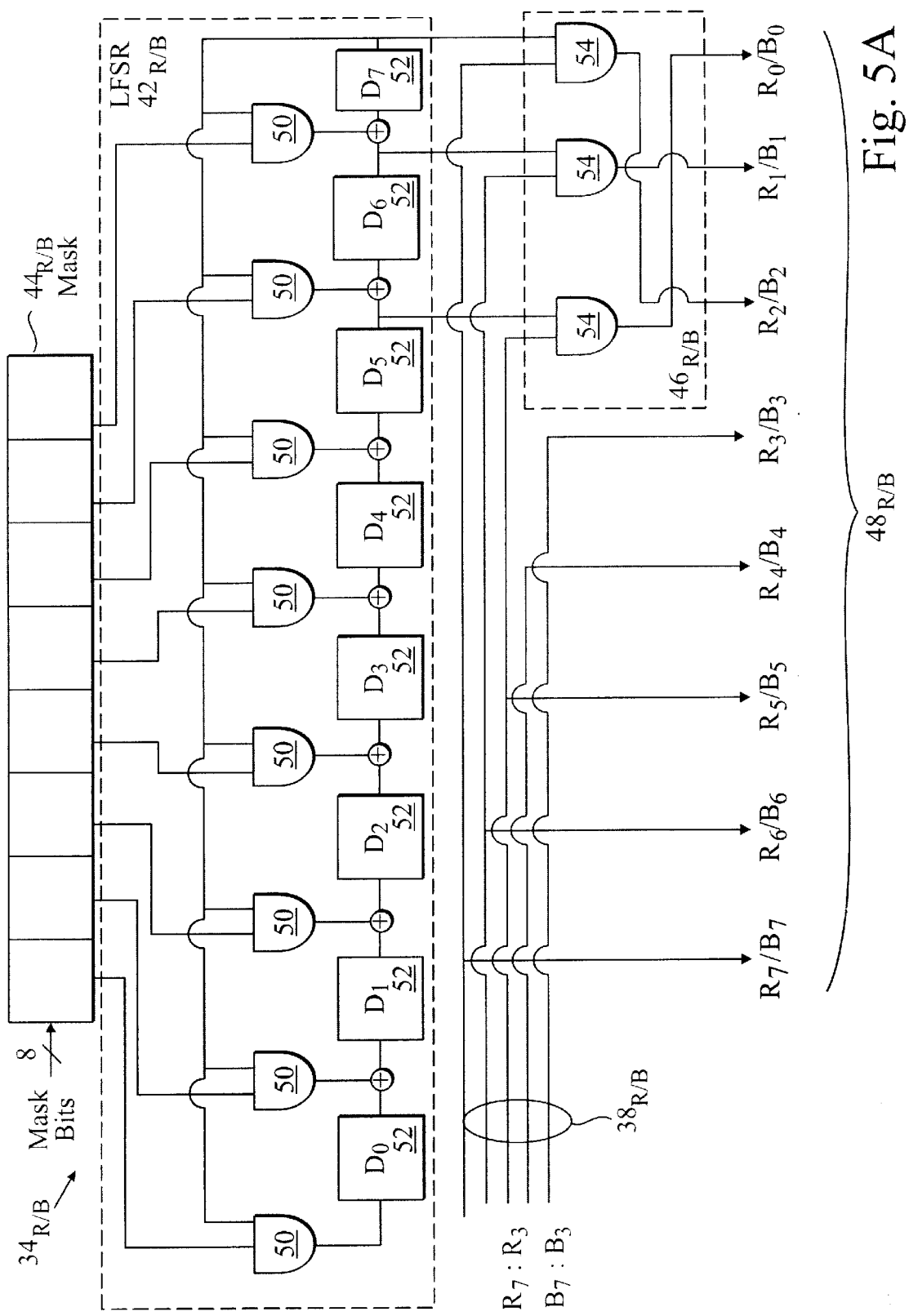
FIG. 5A illustrates a pseudorandom number generator for use with red and/or blue color components of a video information signal in accordance with one embodiment of the present invention.

FIG. 5A illustrates one embodiment of the red/blue dithering logic 34R/B in greater detail. In this figure, elements are labeled with reference numerals used in FIG. 4, but are designated as R/B to indicate that these are the components for either the red color component dithering logic or the blue color component dithering logic. Because the red and blue color components are represented using the same number of bits in video information signal 33, the dithering logic for each of these color components may be the same or substantially similar. However, it is important to remember that each color component is provided with its own set of dithering logic so that the colors of one pixel may each be processed in parallel.

The red or blue color component signal 38R/B is made up of five (5) bits (7:3). The dithering logic 34R/B is used to produce the low order three bits (2:0) which may be combined with the higher order bits (7:3) to ultimately provide the eight-bit, dithered color component signal 48R/B (7:0). Thus, the LFSR 42R/B has three outputs to combination logic 46R/B and these three outputs are combined with the three highest order bits (7:5) of the color component signal 38R/B to produce the three lowest order bits (2:0) of the dithered color component signal 48R/B.

As shown, dithering logic 34R/B may include an 8-bit register, which serves as mask 44R/B for the LFSR 42R/B. The eight bits for the mask 44R/B may be loaded (programmed) to specify a polynomial (termed a "characteristic polynomial") that defines the operation of the LFSR 42R/B. For example, where a logical "1" is loaded into a position in the 8-bit mask register, the corresponding tap of the LFSR 42R/B will be activated. Where a logical "0" is loaded into a position in the mask 44R/B, the corresponding tap of LFSR 42R/B will be deactivated. Each tap of the LFSR 42R/B is implemented as an AND gate 50, thus any logical "1" from the mask 44R/B will activate a corresponding AND gate 50, while a logical "0" from the mask 44R/B will deactivate the corresponding AND gate 50.

LFSR 42R/B also includes a number of registers 52 (eight in this embodiment) coupled in series, with the output of each register 52 being combined with the tap (i.e., the output of an AND gate 50) of the following register 50 as an input to that following register. This combination may be done using XOR gates, for example. The registers 52 may be D-type flip-flops. Thus, the LFSR 42R/B is configured to store (in each register) a series of logical "1s" and "0s" and to shift these values over a distance of each register 52 for every clock pulse (clock trigger not shown for clarity). The feedback from the output of the last register 52 in the sequence to the input of the first register 52, allows for a wrap-around. The characteristic polynomial stored in the mask 44R/B will determine the outputs provided to the combining block 46.

Combining block 46R/B may be configured as a group of three AND gates 54, each of which is coupled to receive one of the outputs of the LFSR 42R/B and one of the high order bits of the color component signal 38R/B. The outputs of these AND gates form the low order bits of the dithered color component signal 48R/B as described above.

Figure 5B:
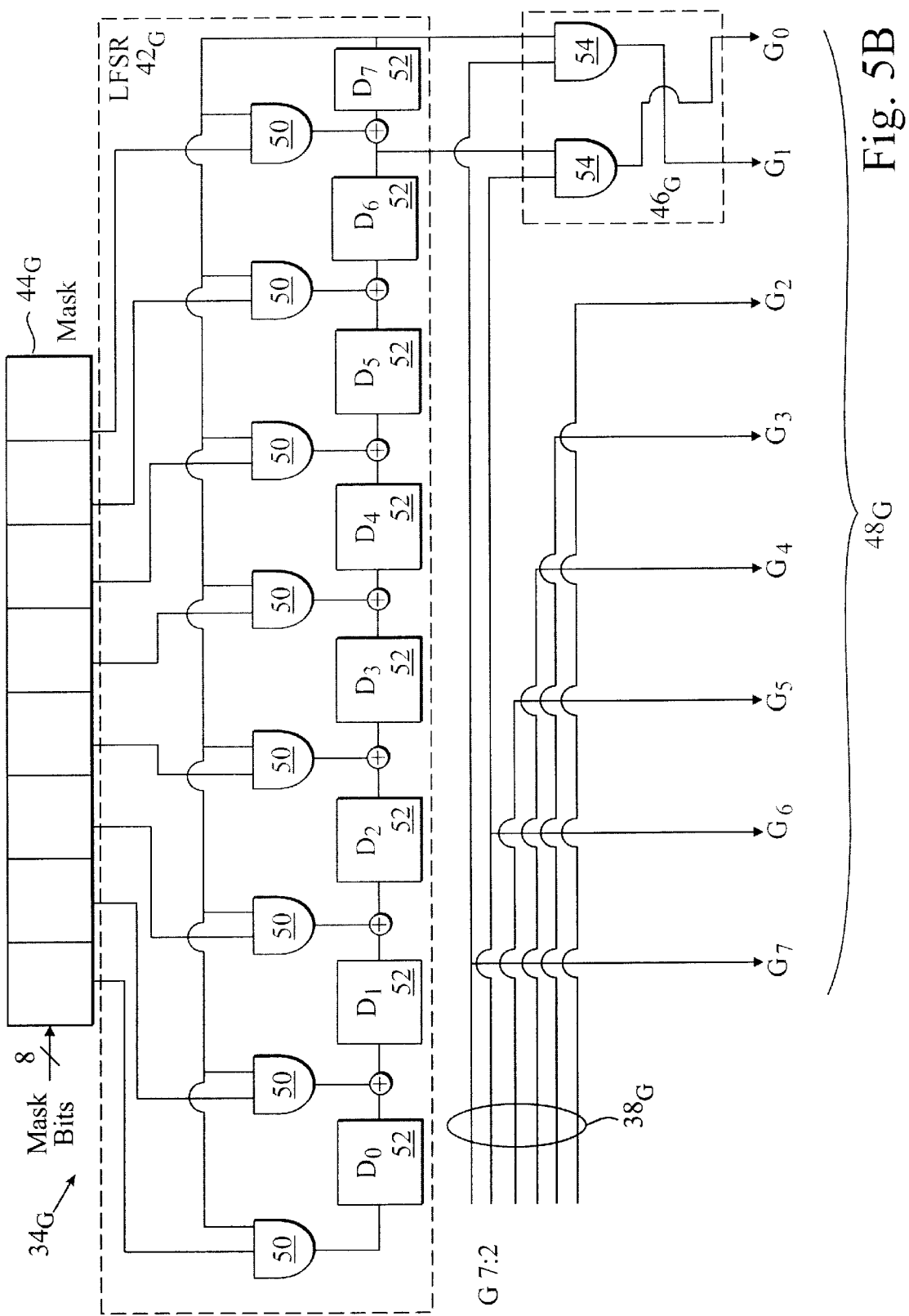
FIG. 5B illustrates a pseudorandom number generator for use with green color components of a video information signal in accordance with one embodiment of the present invention.

FIG. 5B illustrates the green dithering logic 34G in greater detail. In this figure, elements are labeled with reference numerals used in FIG. 4, but are designated as G to indicate that these are the components for green color component dithering logic. Because the green color component is represented using a different number of bits than the red or blue color components in video information signal 33, the dithering logic for the green color component is slightly different than that used for the red and blue color components. By noting these minor differences, it should be readily apparent how the programmable dithering logic may be adapted for use with a color component of any bit size.

The green color component signal 38G is made up of six (6) bits (7:2). The dithering logic 34G is used to produce the low order two bits (1:0) which may be combined with the higher order bits (7:2) to ultimately provide the eight-bit, dithered color component signal 48G (7:0). Thus, the LFSR 42G has two outputs to combination logic 46G and these two outputs are combined with the two highest order bits (7:6) of the color component signal 38G to produce the two lowest order bits (1:0) of the dithered color component signal 48G.

As shown, dithering logic 34G is substantially similar to dithering logic 34R/B and may include an 8-bit register, which serves as mask 44G for the LFSR 42G. The eight bits for the mask 44G may be loaded (programmed) to specify a characteristic polynomial for LFSR 42G. The mask register provides similar functionality to that described above. For example, where a logical "1" is loaded into a position in the 8-bit mask register, the corresponding tap of the LFSR 42G will be activated. Where a logical "0" is loaded into a position in the mask 44G, the corresponding tap of LFSR 42G will be deactivated. Each tap of the LFSR 42G is implemented as an AND gate 50, as described above. Further, LFSR 42G also includes a number of registers 52 (eight in this embodiment) coupled in series, with the output of each register 52 being combined with the tap (i.e., the output of an AND gate 50) of the following register 50 as an input to that following register. Again, XOR gates may be used for the combining.

Because only two low order bits are required, combining block 46R/B may be configured as a group of two AND gates 54, each of which is coupled to receive one of the outputs of the LFSR 42G and one of the high order bits of the color component signal 38G. The outputs of these AND gates 54 form the low order bits of the dithered color component signal 48G as described above.

Preferably, primitive polynomials are chosen as the characteristic polynomials for the LFSRs 42. This will allow for maximum random effect. For one embodiment, the characteristic polynomials for the individual color components may be specified as follows.

| Color | Polynomial | Mask Setting (hex) |
| --- | --- | --- |
| Red | $X^8 + X^6 + X^5 + X + 1$ | B1 |
| Green | $X^7 + X^2 + X + 1$ | 43 |
| Blue | $X^6 + X^2 + X + 1$ | 23 |

By writing the masks 44 to 0, dithering may be disabled altogether and the lowest 3:2:3 bits of the RGB color information will be set to 0.

The PRNGs 40 may be initialized in either of two ways. One option is for the PRNGs 40 to be reset to a default value (e.g., a value of 10000000 loaded in the registers 52) when the system is reset. Alternatively, the PRNGs 40 may be reset to the default value once per frame (e.g., upon receipt of a vertical sync pulse indicating the beginning of a new frame of video information). In either case, the PRNGs should maintain their current value during both the horizontal and vertical blanking intervals of each frame and advance once per pixel clock when a valid pixel is input. An additional one-bit register (not shown) may be included in each PRNG 40 to allow for resetting operations.

Thus a video processing scheme for a digital wireless home network or other computer network environment has been described. Although the foregoing description and accompanying figures discuss and illustrate specific embodiments, it should be appreciated that the present invention is to be measured only in terms of the claims that follow.

What is claimed is:

1. Dithering logic, comprising a number of programmable linear feedback shift registers (LFSRs), each configured to receive one of a number of color components of a video information signal as an input and to provide one of a number of dithered color components of the video information signal as an output, wherein each LFSR includes a mask register configured to accept a characteristic polynomial.

2. The dithering logic of claim 1 wherein the dithered color components each comprise a greater number of bits than the color components.

3. The dithering logic of claim 1 wherein the color components comprise red, green and blue color components.

4. The dithering logic of claim 3 wherein the red and blue color components each comprising five bits and the green color component comprising six bits.

5. A circuit, comprising:

a number of programmable pseudorandom number generators each programmable via a mask register configured to accept a characteristic polynomial, and associated with a color component of a video signal; and a number of logic circuits, each associated with one of the pseudorandom number generators and configured to logically combine the associated color component of the video signal with output signals of the associated pseudorandom number generator.

6. The circuit of claim 5 wherein the color components comprise red, green and blue color components.

7. The circuit of claim 5 wherein each of the logic circuits comprises a number of logical AND gates.

8. A computer network, comprising:

a graphics processor configured to transmit video information signals; and a set-top controller communicatively coupled to the graphics processor so as to receive the video information signal, the set-top controller including programmable dithering logic configured to introduce random noise into the video information signal in accordance with one or more characteristic polynomials, wherein the dithering logic includes a number of programmable linear feedback shift registers (LFSRs), each configured to accept one of the characteristic polynomials and to produce one or more low order bits of at least one of a number of color components present in the video information signal in accordance therewith.

9. The computer network of claim 8 wherein the characteristic polynomials comprise primitive polynomials.

10. The computer network of claim 9 wherein each of the LFSRs is coupled to an associated mask register configured to store at least one of the characteristic polynomials.

11. The computer network of claim 10 wherein the dithering logic further comprises a number of logical combining blocks, each associated with one of the LFSRs, each logical combining block configured to accept one or more outputs of the associated LFSR and one or more bits of an associated color component and to produce therefrom the one or more low order bits of the associated color component.

12. The computer network of claim 11 wherein the logical combining blocks each comprise one or more logical AND gates.

13. The computer network of claim 12 wherein the logical combining block associated with a green one of the color components comprises fewer logical AND gates than the logical combining block associated with a red or blue one of the color components.

* * * * *